United States Patent
Wu et al.

(10) Patent No.: US 8,922,501 B2
(45) Date of Patent: Dec. 30, 2014

(54) CAPACITIVE SENSING DEVICE COMPRISING CROSS-SHAPED SENSING ELEMENTS

(75) Inventors: Zhong-Yuan Wu, Suwon-si (KR); Hyoung-rae Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 981 days.

(21) Appl. No.: 12/972,951

(22) Filed: Dec. 20, 2010

(65) Prior Publication Data

US 2011/0157079 A1     Jun. 30, 2011

(30) Foreign Application Priority Data

Dec. 29, 2009   (KR) .................. 10-2009-0132826

(51) Int. Cl.
  *G06F 3/041*  (2006.01)
  *G06F 3/044*  (2006.01)
(52) U.S. Cl.
  CPC ...... *G06F 3/044* (2013.01); *G06F 2203/04111* (2013.01); *G06F 2203/04108* (2013.01)
  USPC ........................................... 345/173
(58) Field of Classification Search
  CPC .......................................... G06F 2203/04111
  USPC ................................................. 345/173–179
  See application file for complete search history.

(56) References Cited

U.S. PATENT DOCUMENTS

| 7,423,635 | B2 | 9/2008 | Taylor et al. |
| 7,580,030 | B2 | 8/2009 | Marten |
| 7,821,274 | B2 | 10/2010 | Philipp et al. |
| 2007/0008299 | A1 | 1/2007 | Hristov |
| 2008/0297174 | A1 | 12/2008 | Narasimhan et al. |
| 2010/0110038 | A1 | 5/2010 | Mo et al. |
| 2010/0164889 | A1* | 7/2010 | Hristov et al. ............ 345/173 |
| 2011/0025639 | A1* | 2/2011 | Trend et al. ............. 345/174 |

FOREIGN PATENT DOCUMENTS

| CN | 101393502 A | 3/2009 |
| CN | 201298221 | 8/2009 |

OTHER PUBLICATIONS

Chinese Office Action Dated Aug. 12, 2014 From Related Application No. 201010612079.5.

* cited by examiner

*Primary Examiner* — Waseem Moorad
(74) *Attorney, Agent, or Firm* — Volentine & Whitt, PLLC

(57) ABSTRACT

A capacitive sensing device comprises first electrodes in which a plurality of first sensing elements are arranged in rows and columns, and second electrodes in which a plurality of second sensing elements are arranged in rows and columns. Each of the first sensing elements has an iron cross shape, and each of the second sensing elements has a double-cross shape in which a first cross and a second cross overlap each at a shared center point and the second cross is rotated with respect to the first cross. Capacitances are formed between the first sensing elements and the second sensing elements.

16 Claims, 23 Drawing Sheets

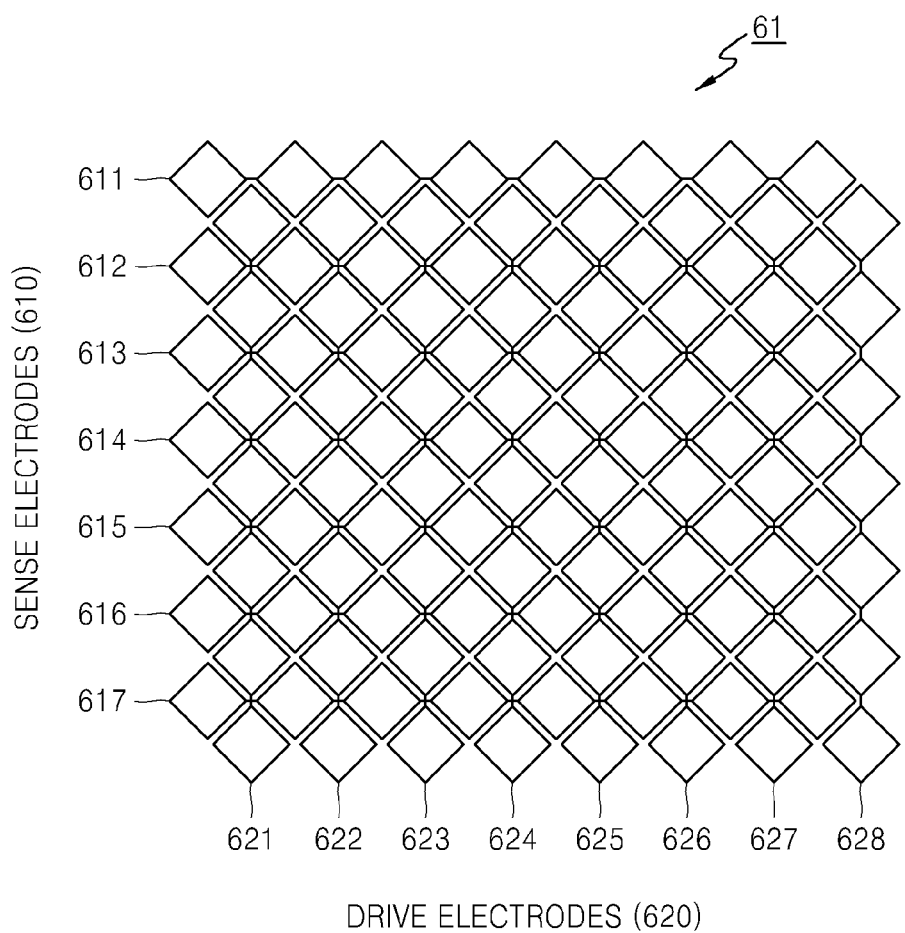

CAPACITIVE SENSING DEVICE COMPRISING CROSS-SHAPED SENSING ELEMENTS

CROSS-REFERENCE TO RELATED APPLICATIONS

This application claims priority under 35 U.S.C. §119 to Korean Patent Application No. 10-2009-0132826 filed on Dec. 29, 2009, the disclosure of which is hereby incorporated by reference in its entirety.

BACKGROUND

Embodiments of the inventive concept relate generally to touch sensing technology. More particularly, embodiments of the inventive concept relate to capacitive touch sensors and devices incorporating the capacitive touch sensors.

A touch sensor is a device that detects the presence of an object such as a finger or stylus within a designated input area. One common form of touch sensor is a touchscreen that senses the presence and position of a finger or stylus on a visual display. Such touchscreens can be found in a wide variety of electronic devices such as automated teller machines, home appliances, televisions, cellular phones, portable media players, personal digital assistants, and e-books, to name but a few.

Touchscreens come in a variety of different forms, including resistive touchscreens, surface acoustic wave touchscreens, infrared touchscreens, and capacitive touchscreens.

A resistive touchscreen comprises multiple layers of resistive material formed on a substrate such as a glass plate or a transparent plastic plate. Where an object comes in contact with the resistive touchscreen, it changes an electric current across one or more of the layers, and the change of current is used to detect a touch event.

A surface acoustic wave touchscreen comprises an ultrasonic wave generator that transmits ultrasonic waves across a surface of the touchscreen. Where an object approaches the surface of the touchscreen, portions of the ultrasonic waves are absorbed or deflected, allowing a touch event to be detected.

An infrared touchscreen comprises light emitting diodes (LEDs) that create infrared beams across a surface of the touchscreen, and photodetectors that detect the beams. Where an object approaches the surface of the touchscreen, the photodetectors detect interruption of some of the infrared beams. The pattern of interrupted beams allows the infrared touchscreen to detect a touch event.

A capacitive touchscreen comprises an insulator such as glass, and a transparent conductor such as indium tin oxide (ITO) formed on the insulator. Where an object such as a finger touches the capacitive touchscreen, it distorts an electrostatic field of the conductor, which can be measured as a change in capacitance. The change of capacitance is used to detect a touch event.

Among existing touchscreen technologies, resistive touchscreens are among the most common because of their relatively low price. One drawback of resistive touchscreens, however, is that they typically can sense only one touch event at a time. Accordingly, as research is conducted on multi-touch user interfaces, capacitive touchscreens are gaining popularity.

SUMMARY

Embodiments of the inventive concept provide capacitive touch sensors and electronic devices incorporating the capacitive touch sensors. Embodiments of the inventive concept also provide methods of manufacturing capacitive touch sensors.

According to one embodiment of the inventive concept, a capacitive sensing device comprises first electrodes in which a plurality of first sensing elements are arranged in rows and columns, and second electrodes in which a plurality of second sensing elements are arranged in rows and columns. Each of the first sensing elements has an iron cross shape, each of the second sensing elements has a double-cross shape in which a first cross and a second cross overlap each other at a shared center point and the second cross is rotated with respect to the first cross, and capacitances are formed between the first sensing elements and the second sensing elements.

In certain embodiments, the second cross is rotated by 45° with respect to the first cross.

In certain embodiments, the first electrodes are drive electrodes and the second electrodes are sense electrodes.

In certain embodiments, the first sensing elements are electrically connected to each other in one direction by flying conductors.

In certain embodiments, the first electrodes and the second electrodes are formed in one layer.

In certain embodiments, the first cross and the second cross have different lengths.

In certain embodiments, additional crosses are formed by lines perpendicular to each of four arms of the first cross of the second sensing elements, and the first sensing elements are separated from the second sensing elements to form capacitors, and are symmetrically formed to fill remaining spaces in which the second sensing elements are not formed.

In certain embodiments, the first cross is symmetrical about a central axis.

In certain embodiments, the first electrodes and the second electrodes are formed in one layer.

In certain embodiments, additional crosses are formed by lines perpendicular to each of four arms of the second cross of the second sensing elements, and the first sensing elements are separated from the second sensing elements to form capacitors, and are symmetrically formed to fill remaining spaces in which the second sensing elements are not formed.

In certain embodiments, the four arms of the second cross are symmetrical to each other.

In certain embodiments, the first electrodes and the second electrodes are formed in one layer.

In certain embodiments, additional crosses are formed by lines perpendicular to each of four arms of the first cross of the second sensing elements, additional crosses are formed by lines perpendicular to each of four arms of the second cross of the second sensing elements, and the plurality of the first sensing elements are separated from the second sensing elements to form capacitors, and are symmetrically formed to fill remaining spaces in which the second sensing elements are not formed.

In certain embodiments, the first cross is symmetrical about a first axis, and the second cross is symmetrical about a second axis.

According to another embodiment of the inventive concept, a capacitive sensing device comprises first electrodes in which a plurality of first sensing elements are arranged in rows and columns, and second electrodes in which a plurality of second sensing elements are arranged in rows and columns. Each of the second sensing elements has a shape comprising a cross having four arms, and additional crosses formed by lines perpendicular to the four arms, and the first sensing elements are separated from the second sensing elements to form capacitors, and are symmetrically formed to fill remaining spaces in which the second sensing elements are not formed.

In certain embodiments, the first electrodes are drive electrodes and the second electrodes are sense electrodes.

In certain embodiments, the first sensing elements are electrically connected to each other in one direction by flying conductors.

In certain embodiments, the first electrodes and the second electrodes are formed in one layer.

In certain embodiments, the cross is rotated at an angle of 45° to form an x shape, and wherein an additional line is formed vertically through a center point of the x shape.

In certain embodiments, additional crosses are formed by lines perpendicular to upper and lower arms of the additional line.

According to another embodiment of the inventive concept, a capacitive sensing device comprises first electrodes in which a plurality of first sensing elements are arranged in rows and columns, and second electrodes in which a plurality of second sensing elements are arranged in rows and columns. Each of second sensing elements has an x shape in which additional crosses are formed by adding lines perpendicular to each of four arms of the x shape, and the first sensing elements are separated from the second sensing elements to form capacitors, and are symmetrically formed to fill remaining spaces in which the second sensing elements are not formed.

In certain embodiments, the first electrodes are drive electrodes and the second electrodes are sense electrodes.

In certain embodiments, the first sensing elements are electrically connected to each other in a horizontal direction by flying conductors.

In certain embodiments, the first electrodes and the second electrodes are formed in one layer.

In certain embodiments, each of the second sensing elements has an x shape with a vertical line passing through a center point of the x shape.

In certain embodiments, additional crosses are formed by lines perpendicular to upper and lower arms of the vertical line with respect to the center point of the x shape.

In certain embodiments, each of the second sensing elements has a horizontal line passing through a center point of the x shape.

In certain embodiments, the first sensing elements are electrically connected to each other in a horizontal direction by flying conductors.

In certain embodiments, the first electrodes and the second electrodes are formed in one layer.

In certain embodiments, additional crosses are formed by lines perpendicular to left and right arms of the horizontal line with respect to the center point of the x shape.

According to another embodiment of the inventive concept, a capacitive sensing system comprises at least one touch panel, first electrodes arranged under the touch panel in rows and columns that are electrically a connected to each other, second electrodes arranged in rows and columns that are electrically connected to each other, wherein the first electrodes and the second electrodes are formed in one layer, wherein the second electrodes have a double-cross shape in which a first cross and a second cross overlap each other at a shared center point and the second cross is rotated with respect to the first cross, and wherein, where a user touches the touch panel, a touch event is detected for at least one point where a row or column of the first electrodes crosses a row or column of the second electrodes, and a shielding layer formed under the one layer in which the first electrodes and the second electrodes are formed.

In certain embodiments, the first electrodes are drive electrodes and the second electrodes are sense electrodes.

In certain embodiments, the second cross is rotated by 45° with respect to the first cross.

In certain embodiments, the one layer is formed of indium tin oxide.

According to another embodiment of the inventive concept, a method of manufacturing a capacitive sensing device comprises forming first electrodes in which a plurality of first sensing elements are arranged in rows and columns, forming second electrodes in which a plurality of second sensing elements are arranged in rows and columns, and forming capacitances between the first sensing elements and the second sensing elements. Each of the first sensing elements has an iron cross shape, and each of the second sensing elements has a double-cross shape in which a first cross and a second cross overlap each other at a shared center point and the second cross is rotated with respect to the first cross.

In certain embodiments, the second cross is rotated by 45° with respect to the first cross.

In certain embodiments, the first electrodes are drive electrodes and the second electrodes are sense electrodes.

In certain embodiments, the first sensing elements are electrically connected to each other in a horizontal direction by flying conductors.

In certain embodiments, the first electrodes and the second electrodes are formed in one layer.

BRIEF DESCRIPTION OF THE DRAWINGS

The drawings illustrate selected embodiments of the inventive concept. In the drawings, like reference numbers indicate like features.

FIGS. 6A through 6D are diagrams illustrating various capacitive sensing patterns.

DETAILED DESCRIPTION OF THE EMBODIMENTS

Embodiments of the inventive concept are described below with reference to the accompanying drawings. These embodiments are presented as teaching examples and should not be construed to limit the scope of the inventive concept.

Embodiments of the inventive concept relate generally to capacitive touch sensors, such as capacitive touchscreens. Capacitive touch sensors can provide various advantages relative to other forms of touch sensors. Examples of such advantages include relatively high sensitivity and light transmittance, and the ability to provide multi-touch sensing.

In the description that follows, the terms "touchscreen" and "touch panel" are used interchangeably. In addition, the terms "driving lines" and "drive electrodes" are used interchangeably, and the terms "sensing lines" and "sense electrodes" are used interchangeably.

Figure 1:
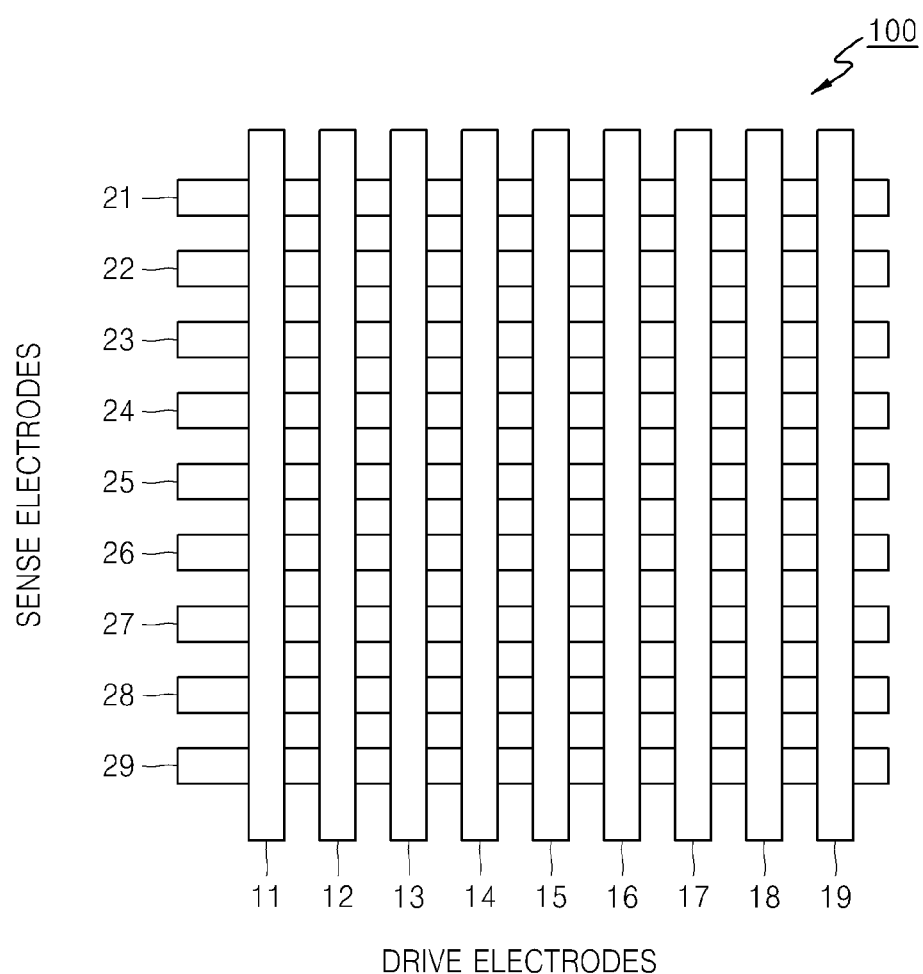
FIG. 1 is a diagram illustrating a capacitive sensing device.

FIG. 1 is a schematic diagram of a capacitive sensing device.

Referring to FIG. 1, the capacitive sensing device comprises a touch pattern layer 100 comprising a plurality of sense electrodes 21 through 29 electrically connected in a horizontal direction, and a plurality of drive electrodes 11 through 19 electrically connected in a vertical direction.

In some embodiments, sense electrodes 21 through 29 form one layer and drive electrodes 11 through 19 form another layer. Alternatively, sense electrodes 21 through 29 and drive electrodes 11 through 19 can form one layer by varying their shapes, as described below.

Capacitances are formed at locations where sense electrodes 21 through 29 and drive electrodes 11 through 19 cross each other. The capacitive sensing device scans a capacitance map formed by rows and columns of sense electrodes 21 through 29 and drive electrodes 11 through 19 and reads capacitances at grid nodes (or grid points or pixels) in the capacitance map. The capacitance of a grid node decreases in the presence of a user's finger, allowing the capacitive sensing device to detect the location of a touch event.

Touch pattern layer 100 can be formed by depositing an indium tin oxide (ITO) layer or a conductive polymer layer on a substrate, such as glass or polyethylene terephthalate (PET), and then patterning the deposited layer to form drive and sense electrodes.

Figure 2A:
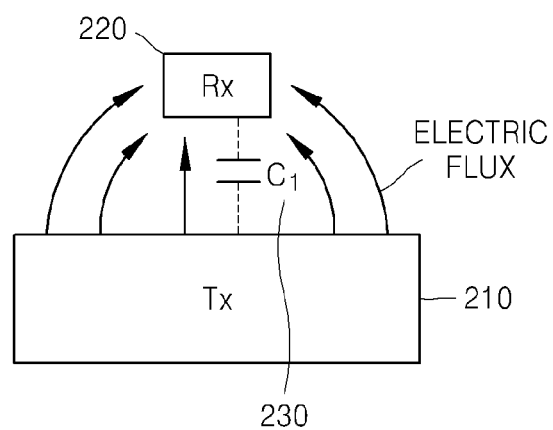
FIGS. 2A and 2B are diagrams illustrating basic operations of a capacitive sensing device.
Figure 2B:
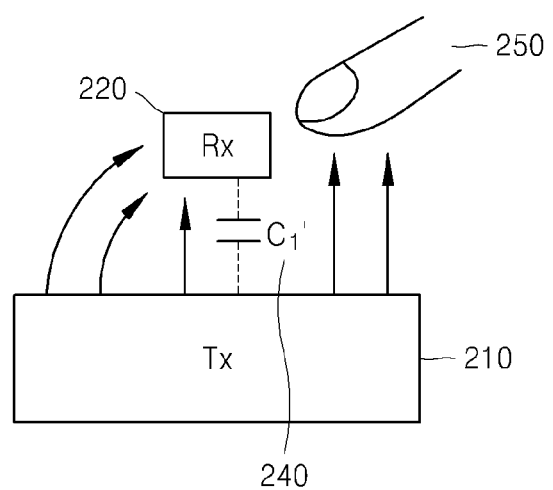

FIGS. 2A and 2B are diagrams illustrating basic operating principles of a capacitive sensing device.

FIG. 2A illustrates two terminals of a capacitance. The two terminals include a transmitter (Tx) 210 and a receiver (Rx) 220. One of the two terminals is a drive electrode and the other terminal is a sense electrode in the capacitive sensing device. An electric field is formed between Tx 210 and Rx 220 due to electric flux. A very small capacitance C1 230 is formed between the two terminals.

Referring to FIG. 2B, as a user's finger 250 approaches the two terminals, the electric field formed between Tx 210 and Rx 220 varies due to a capacitance of a human body. Consequently, capacitance C1 230 of FIG. 2A changes to a new capacitance C1' 240. The capacitive sensing device senses a touch event according to the capacitance variation.

Figure 3A:
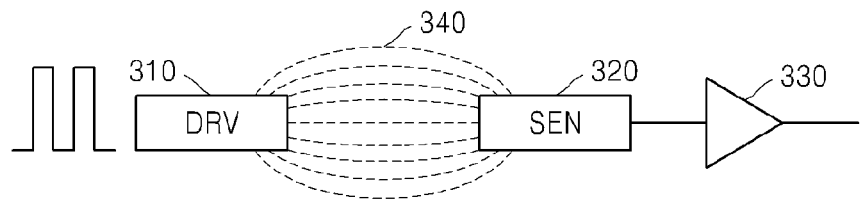
FIGS. 3A and 3B are diagrams illustrating a sensing operation of a capacitive sensing device.
Figure 3B:
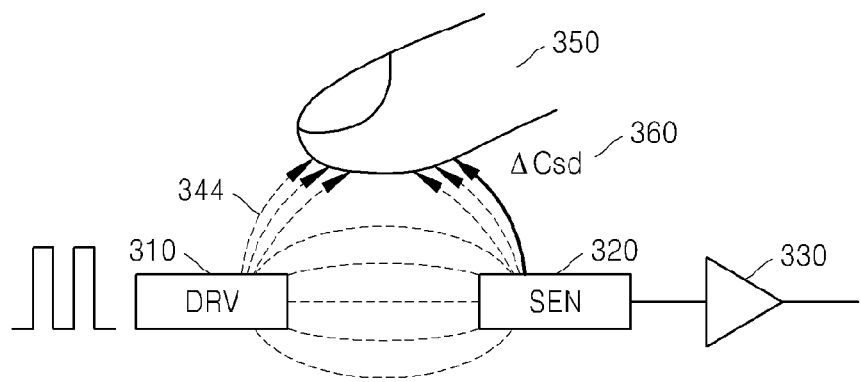

FIGS. 3A and 3B are diagrams illustrating a sensing operation of a capacitive sensing device.

Referring to FIG. 3A, a capacitance exists between a drive electrode 310 and a sense electrode 320 facing each other, and an electric field 340 is formed between drive electrode 310 and sense electrode 320. Sense electrode 320 senses a variation in the capacitance and outputs a corresponding sensing signal via a buffer 330.

Referring to FIG. 3B, as a user's finger 350 approaches drive electrode 310 and sense electrode 320, the capacitance between drive electrode 310 and sense electrode 320 changes as indicated by a capacitance variation Csd 360. As a result, electric field 340 varies as indicated by a reference numeral 344. A capacitive sensing device comprising drive electrode 310 and sensing electrode 320 senses a touch event according to capacitance variation Csd 360.

Figure 4A:
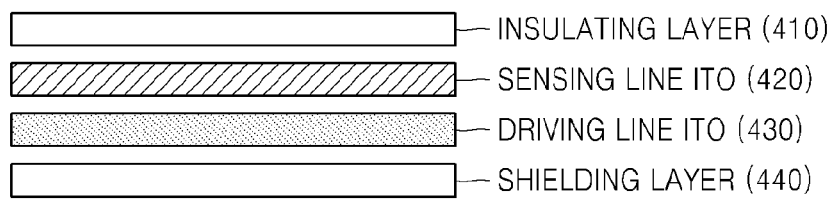
FIGS. 4A and 4B are cross-sectional diagrams of capacitive sensing devices.
Figure 4B:
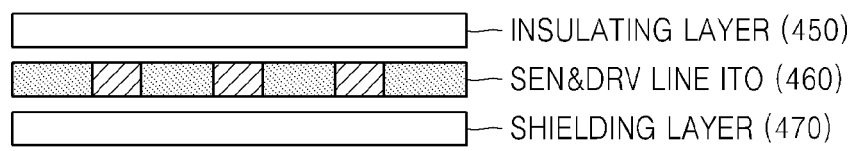

FIGS. 4A and 4B are cross-sectional diagrams of capacitive sensing devices. FIG. 4A illustrates a capacitive sensing device where sense electrodes and drive electrodes are formed in different ITO layers, and FIG. 4B illustrates a capacitive sensing device where sense electrodes and drive electrodes are formed in the same ITO layer.

Referring to FIG. 4A, a capacitive sensing device comprises a sensing line ITO layer 420 and a driving line ITO layer 430 formed between an insulating layer 410 and a shielding layer 440. In this example, due to the thickness of the capacitive sensing device, light may not be sufficiently transmitted through a display panel, or an intense light source may be required. As a result, the brightness of the display panel may be reduced. In addition, the thickness of the device may prevent the capacitive sensing device from being used in small devices. Moreover, an additional insulating layer (not shown) may be required between sensing line ITO layer 420 and driving line ITO layer 430, and an electric field formed therebetween must pass through the additional insulating layer. This additional layer can decrease the sensitivity of the capacitive sensing device.

The capacitive sensing device of FIG. 4B addresses certain shortcomings of the capacitive sensing device of FIG. 4A. Referring to FIG. 4A a capacitive sensing device comprises an insulating layer 450, a sensing and driving line ITO layer 460, and a shielding layer 470. Sensing and driving line ITO layer 460 comprises both sensing lines and driving lines.

Because the capacitive sensing device of FIG. 4B has fewer layers than the capacitive sensing device of FIG. 4A, it can provide increased light transmittance and greater sensitivity. In addition, where an electrode array is appropriately arranged in the capacitive sensing device of FIG. 4B, precise interpolation methods can be used to determine the location of a user's finger, the number of electrode pins can be reduced, and the density of an electric field can be increased.

Figure 5:
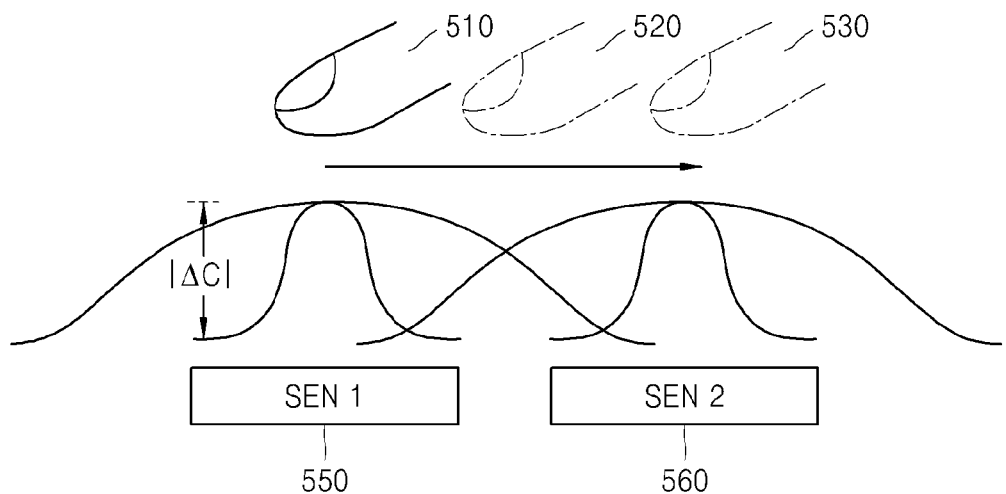
FIG. 5 is a diagram illustrating capacitance variations in a capacitive sensing device according to a position of a user's finger.

FIG. 5 is a diagram illustrating capacitance variations in a capacitive sensing device according to a position of a user's finger.

Referring to FIG. 5, where the user's finger moves between positions 510, 520, and 530, a capacitance change |C| moves accordingly. Accordingly, rather than causing abrupt signal variations, smooth sensing variation is provided between a first sensing line SEN1 550 and a second sensing line SEN2 560 when the finger moves.

FIGS. 6A through 6D are diagrams illustrating various capacitive sensing patterns.

Referring to FIG. 6A, in a capacitive sensing pattern 61, capacitances between sense electrodes 610 and drive electrodes 620 are formed in diamond shapes. As illustrated in FIG. 6A, in each of rows 611 through 617 of sense electrodes 610, multiple grid units are electrically connected to each other. Likewise, in each of columns 621 through 628 of drive electrodes 620, multiple grid units are also electrically connected to each other. For convenience of explanation, this type of capacitive sensing pattern 61 will be referred to as an "A-type pattern".

Figure 6B:
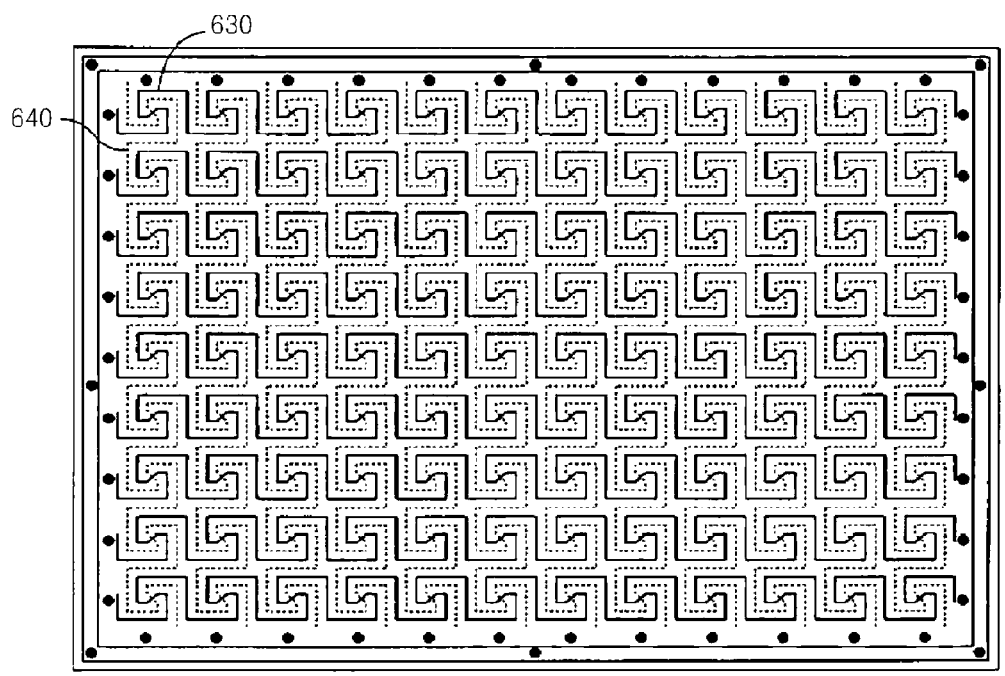

Referring to FIG. 6B, a capacitive sensing pattern is formed in intersecting spiral shapes. These shapes increase perimeters between sense electrodes 630 and drive electrodes 640, and they also increase capacitances between sense electrodes 630 and drive electrodes 640. For convenience of explanation, this type of capacitive sensing pattern will be referred to as a "B-type pattern".

Figure 6C:
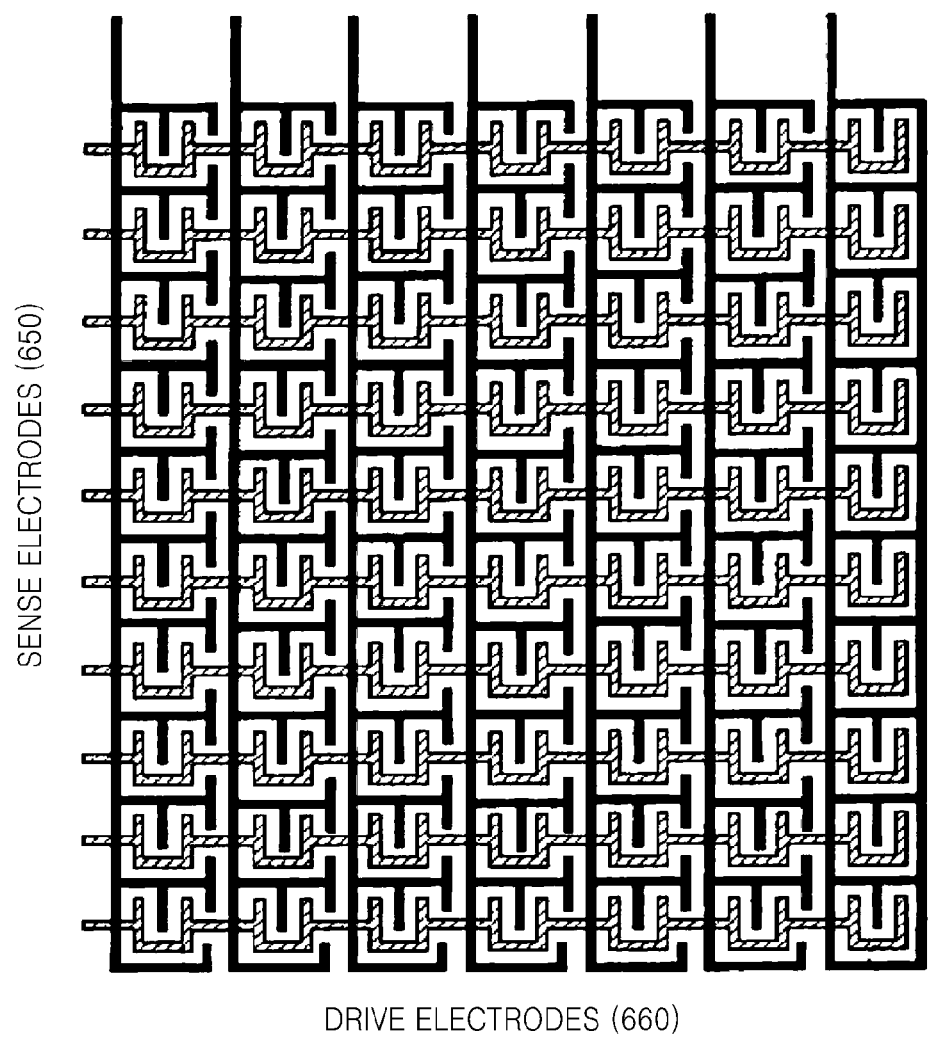

Referring to FIG. 6C, a capacitive sensing pattern is formed with interlaced shapes. These shapes increase capacitances between sense electrodes 650 and drive electrodes 660, but they reduce symmetry between sense electrodes 650 and drive electrodes 660. For convenience of explanation, this type of capacitive sensing pattern will be referred to as a "C-type pattern".

Figure 6D:
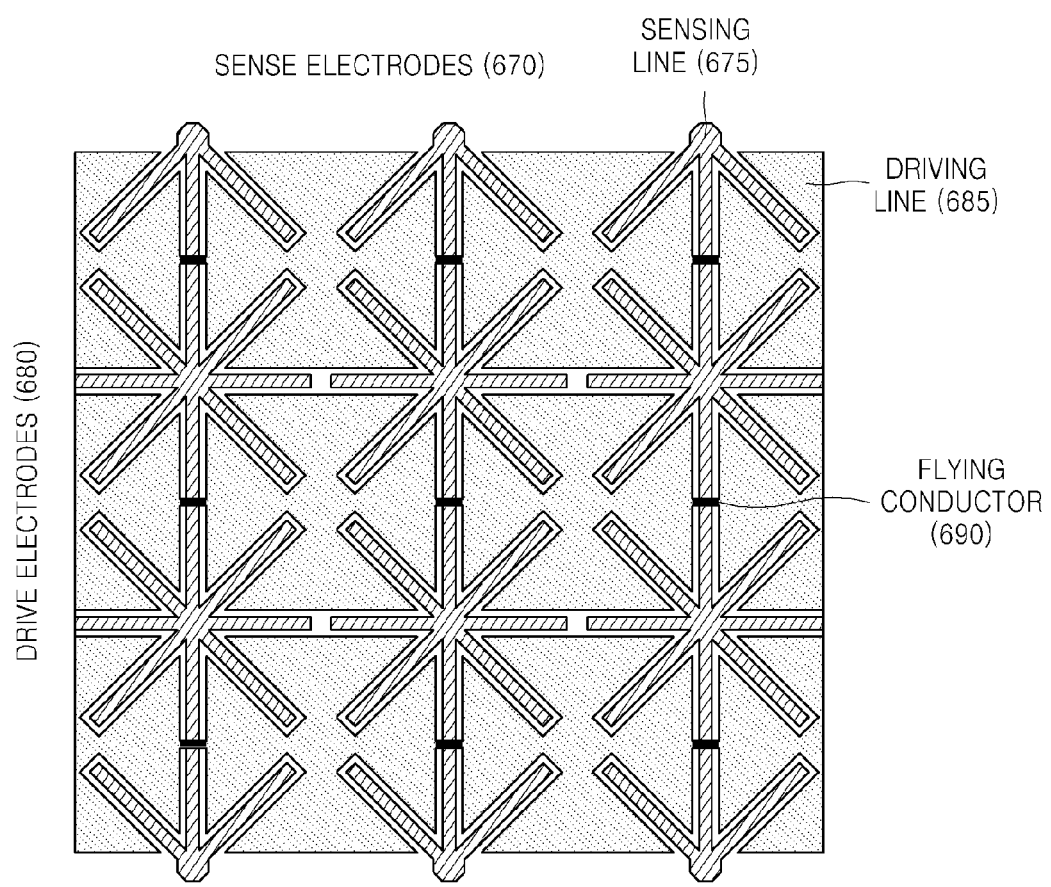
Figure 7A:
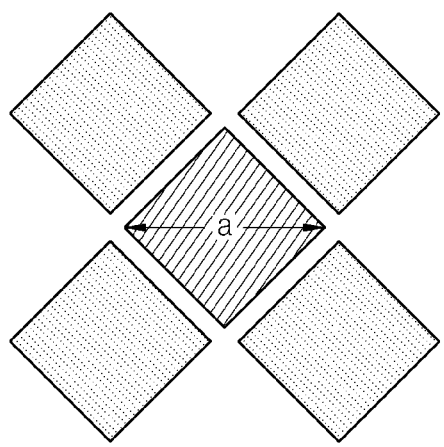
FIGS. 7A through 7D are diagrams for comparing sensing line perimeters of the capacitive sensing patterns illustrated in FIGS. 6A through 6D.
Figure 7B:
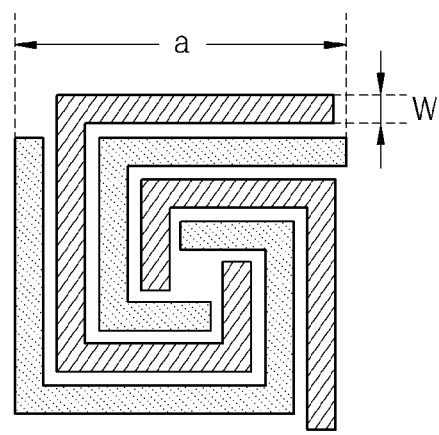
Figure 7C:
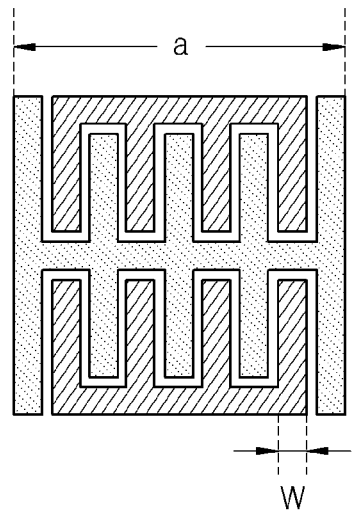
Figure 7D:
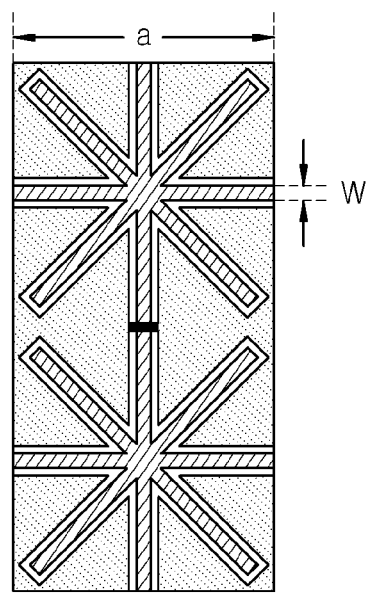

Referring to FIG. 6D, a capacitive sensing pattern is formed with sense electrodes 670 arranged in a double-cross shape in which two crosses overlap each other by sharing a center point and having one cross rotated with respect to the other cross. Although the two crosses in FIG. 6D are rotated 45° with respect to each other, they could be rotated by different amounts between 0° and 90°.

Drive electrodes 680 are formed in a shape for filling remaining spaces in which sense electrodes 670 are not formed. In the example of FIG. 6D, drive electrodes 680 are formed in an iron cross shape in which one grid unit has four arms widening outwards. Where the two crosses of sense electrodes 670 are separated by 45°, the iron cross shape is symmetrical. Otherwise, the iron cross shape may be deformed asymmetrically.

In sense electrodes 670, arms of the two crosses (+ and x) overlapping by sharing the center point may have different lengths. Any one cross may have longer arms than the other cross. However, arms of one cross may have the same length for symmetry. In one driving line 685, grid units formed in an iron cross shape are electrically connected by flying conductors 690. Drive electrodes 680 and sense electrodes 670 can be formed in one layer to increase capacitance efficiency. For convenience of explanation, this type of capacitive sensing pattern is referred to as a "D-type pattern".

Although sense electrodes 670 have a double-cross shape in which two crosses overlap by sharing a center point and drive electrodes 680 have an iron cross shape for filling remaining spaces in FIG. 6D, sense electrodes 670 and drive electrodes 680 can be switched in alternative embodiments.

Sensing sensitivity tends to increase in proportion to capacitances between sense electrodes 670 and drive electrodes 680. As represented by equation (1) below, a capacitance is proportional to a sensing line perimeter of a grid unit and is inversely proportional to a distance between sensing and driving lines.

$$C \approx \frac{P}{d} \quad (1)$$

In equation (1), "C" represents capacitance, "P" represents a sensing line perimeter, and "d" represents a distance between sensing and driving lines. According to equation (1), capacitance "C" can be increased by reducing "d" or increasing "P". In the examples shown in FIGS. 6A through 6D, capacitance is varied by modifying "P".

FIGS. 7A through 7D are diagrams for comparing sensing line perimeters of the capacitive sensing patterns illustrated in FIGS. 6A through 6D. In each of FIGS. 7A through 7D, a grid unit length "a" is shown for a corresponding one of the capacitive sensing patterns shown in FIGS. 6A through 6D. These grid unit lengths can be used to calculate sensing line perimeters "P", as indicated by equations (2)-(5) below.

$$A: Ps \approx 4 \frac{\sqrt{2}\,a}{2} \approx 2.8a \quad (2)$$

$$B: Ps \approx 12a - 52w - 63s \quad (3)$$

$$C: Ps \approx 8a - 10w - 32s \quad (4)$$

$$D: Ps \approx 9.6a - 37w - 13.5s \quad (5)$$

Equation (2) corresponds to the A-type pattern, equation (3) corresponds to the B-type pattern, equation (4) corresponds to the C-type pattern, and equation (5) corresponds to the D-type pattern. In equations (2)-(5), "Ps" represents a sensing line perimeter, "a" represents a grid unit width, "w" represents a sensing line width, and "s" represents a distance between sensing and driving lines.

Figure 8:
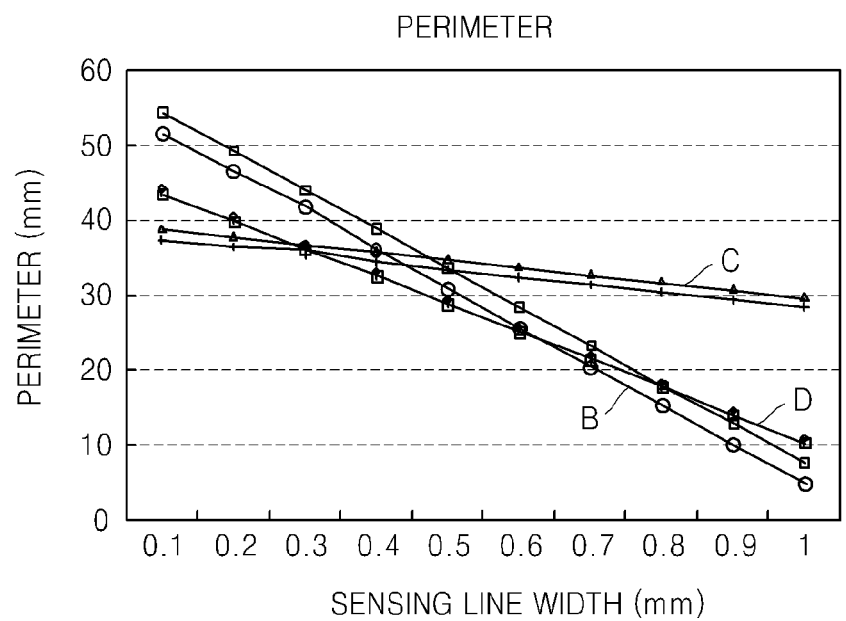
FIG. 8 is a graph illustrating the sensing line perimeters of FIGS. 7A through 7D as a function of different sensing line widths.

FIG. 8 is a graph illustrating the sensing line perimeters of FIGS. 7A through 7D as a function of sensing line widths. The sensing line perimeter of the A-type pattern does not vary as a function of a sensing line width w, and therefore the A-type pattern is not represented in FIG. 8.

As illustrated in FIG. 8, for smaller values of sensing line width w, the sensing line perimeters Ps increase in order of C<D<B. On the other hand, for larger values of sensing line width w, the sensing line perimeters Ps increase in the order of B<D<C.

A larger sensing line perimeter Ps tends to indicate increased sensing sensitivity and improved performance of a capacitive sensing device. However, as indicated by the example of FIG. 5, it is desirable to maintain consistent capacitance variation in the presence of a moving finger. This can be achieved by forming the sense electrodes and drive electrodes in a symmetric manner.

Figure 9:
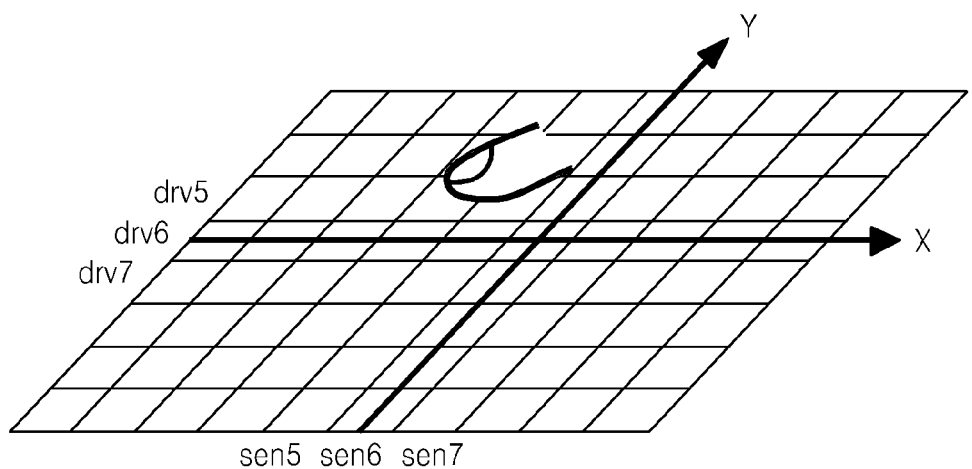
FIG. 9 is a diagram illustrating a simulation environment for analyzing capacitance variations of different capacitive sensing patterns.

FIG. 9 is a diagram illustrating a simulation environment for analyzing capacitance variations of different capacitive sensing patterns.

The capacitive sensing pattern is analyzed by simulating specific user actions on a simulation panel and observing the behavior of capacitive sensing patterns in response to the user actions. In various simulations, a user's is moved between fifth and seventh sensing lines sen5 and sen7 along an X axis, and between fifth and seventh driving lines drv5 and drv7 along a Y axis.

In the example of FIG. 9, the simulation panel comprises ten driving lines and ten sensing lines. A grid unit width is 5 mm and a sensing line width is 0.6 mm. A distance between sensing and driving lines is 25 um and a measuring interval is 1 mm. A finger size is 7 mm×7 mm.

FIGS. 10A and 10B, 11A and 11B, 12A and 12B, and 13A and 13B are graphs showing capacitance variations due to a finger moving on capacitive sensing patterns in the simulation environment illustrated in FIG. 9. In FIGS. 10A through 13B, a Y axis represents a capacitance variation and an X axis represents a position of a finger on a touch panel. Position(X) on the X axis represents a position of a finger along sensing lines sen5, sen6, and sen7; Position(Y) on the X axis represents a position of a finger touch along driving lines drv5, drv6, and drv7, and Position (45 degree orientation) on the X axis represents a position of a finger along sensing and driving lines in a 45°-rotated diagonal orientation drv5sen5, drv6sen6, drv7sen7.

Figure 10A:
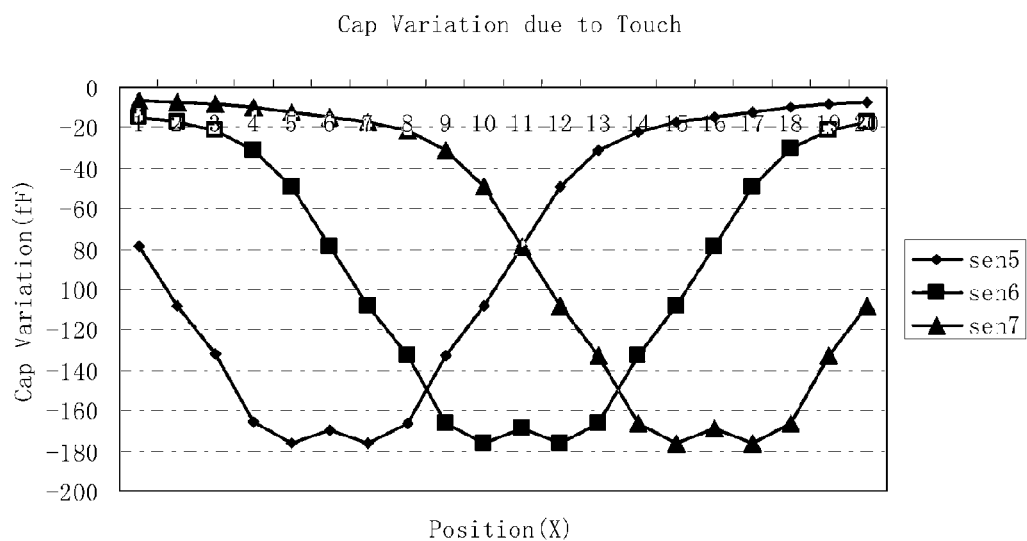
FIG. 10A is a graph illustrating capacitance variations due to a finger moving along sensing lines of a capacitive sensing pattern in the simulation environment of FIG. 9.

FIG. 10A is a graph illustrating capacitance variations due to a finger moving along sensing lines of an A-type pattern in the simulation environment of FIG. 9. Because the A-type pattern is formed with diamond shapes having symmetry between sensing and driving lines, the capacitance variations also have symmetry. However, in FIG. 10A, because the capacitance variations do not form perfect parabolas, capacitances are smaller than those of the other three capacitive sensing patterns, and thus sensing sensitivity is reduced.

Figure 10B:
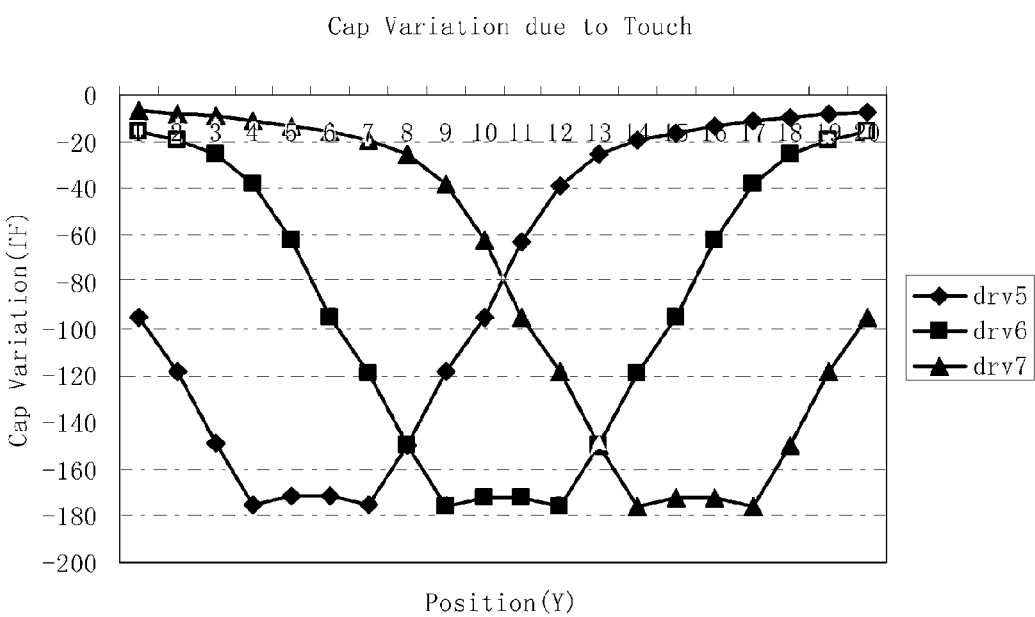
FIG. 10B is a graph illustrating capacitance variations due to a finger moving along driving lines of a capacitive sensing pattern in the simulation environment of FIG. 9.

FIG. 10B is a graph illustrating capacitance variations due to a finger moving along driving lines of an A-type pattern in the simulation environment of FIG. 9. As in FIG. 10A, the capacitance variations are substantially symmetrical, but they are distorted.

Figure 11A:
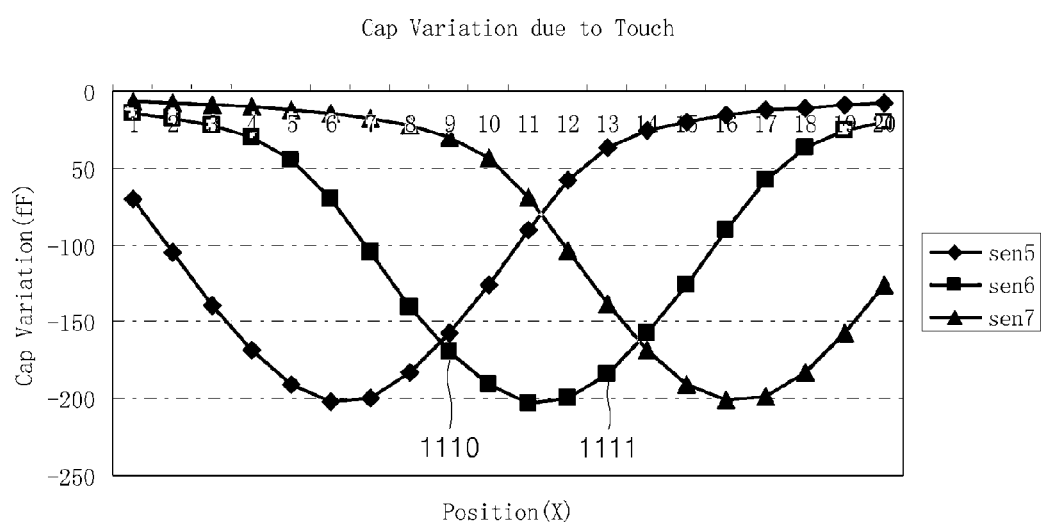
FIG. 11A is a graph illustrating capacitance variations due to a finger moving along sensing lines of a capacitive sensing pattern in the simulation environment of FIG. 9.

FIG. 11A is a graph illustrating capacitance variations due to a finger moving along sensing lines of a B-type pattern in the simulation environment illustrated in FIG. 9. In FIG. 11A, sensing sensitivity is superior to that of the A-type pattern but symmetry does not exist between capacitances 1110 and 1111 because the physical shapes of corresponding sensing and driving lines are not symmetrical.

Figure 11B:
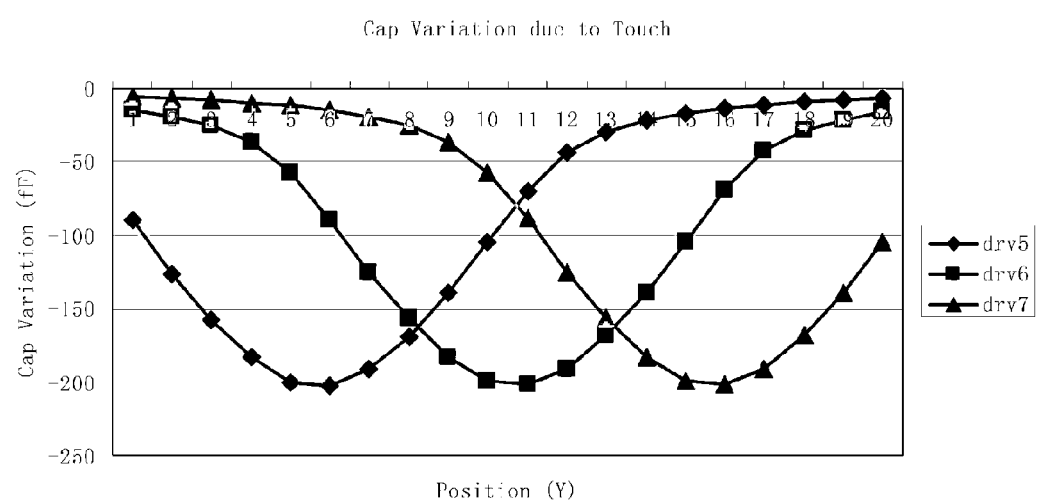
FIG. 11B is a graph illustrating capacitance variations due to a finger moving along driving lines of a capacitive sensing pattern in the simulation environment of FIG. 9.

FIG. 11B is a graph illustrating capacitance variations due to a finger moving along driving lines of a B-type pattern in the simulation environment of FIG. 9. As in FIG. 11A, sensing sensitivity is superior to that of the A-type pattern but capacitive variations of the driving lines are not symmetrical.

Figure 11C:
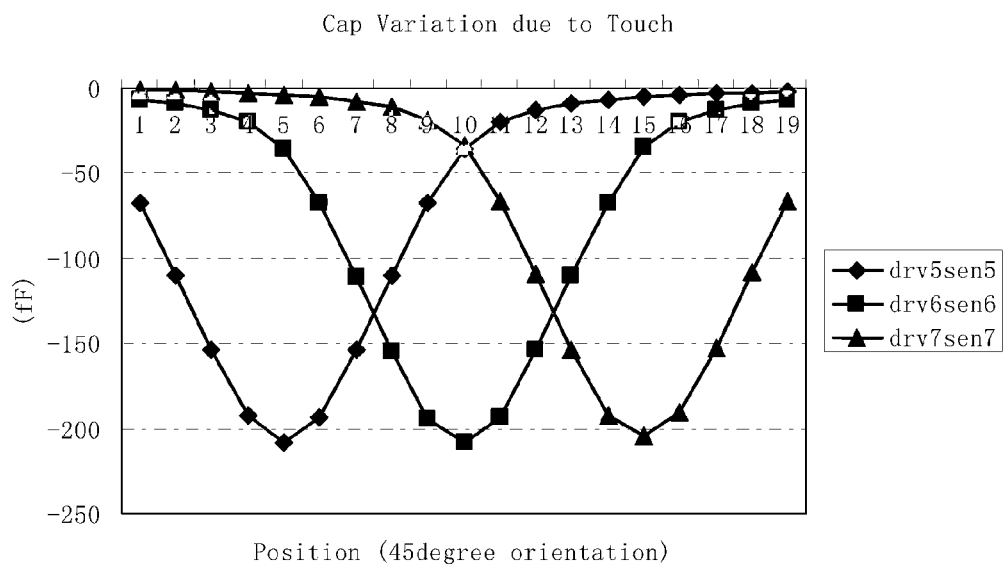
FIG. 11C is a graph illustrating capacitance variations due to a finger moving along sensing and driving lines of a capacitive sensing pattern in the simulation environment of FIG. 9.

FIG. 11C is a graph illustrating capacitance variations due to a finger moving in a 45° orientation along sensing and driving lines of a B-type pattern in the simulation environment of FIG. 9. In FIG. 11C, sensing sensitivity is superior to that of the A-type pattern and symmetry is superior to that of FIGS. 11A and 11B.

Figure 12A:
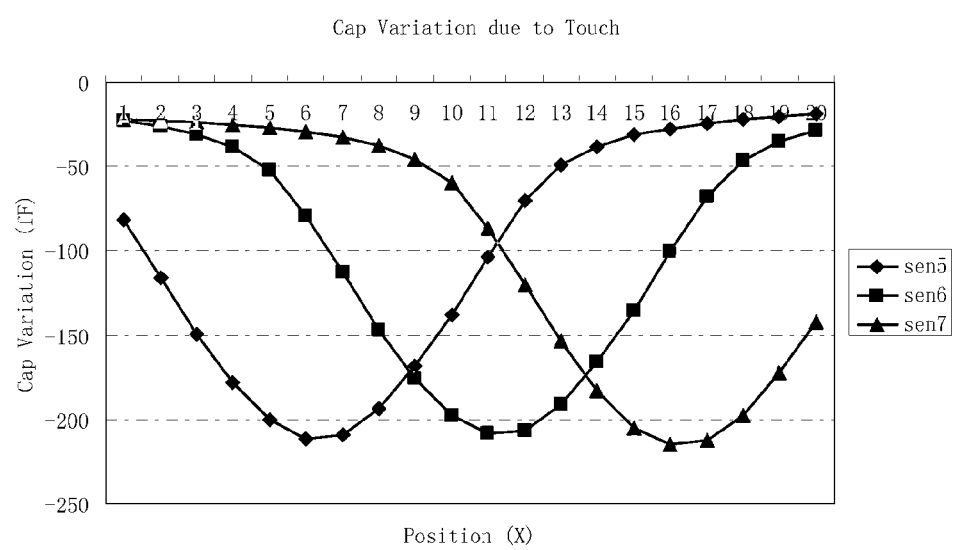
FIG. 12A is a graph illustrating capacitance variations due to a finger moving along sensing lines of a capacitive sensing pattern in the simulation environment of FIG. 9.

FIG. 12A is a graph illustrating capacitance variations due to a finger moving along sensing lines of a C-type pattern in the simulation environment of FIG. 9. As in FIGS. 11A and 11B, sensing sensitivity is superior to that of the A-type pattern but the capacitive variations are not symmetrical.

Figure 12B:
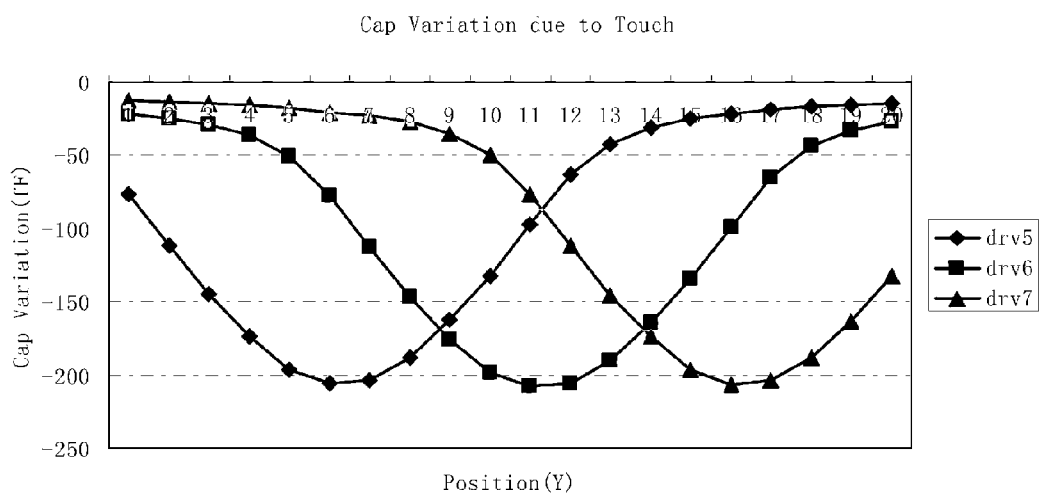
FIG. 12B is a graph illustrating capacitance variations due to a finger moving along driving lines of a capacitive sensing pattern in the simulation environment of FIG. 9.

FIG. 12B is a graph illustrating capacitance variations due to a finger moving along driving lines of a C-type pattern in the simulation environment of FIG. 9. As in FIG. 12A, sensing sensitivity is superior to that of the A-type pattern but the capacitive variations are not symmetrical.

Figure 12C:
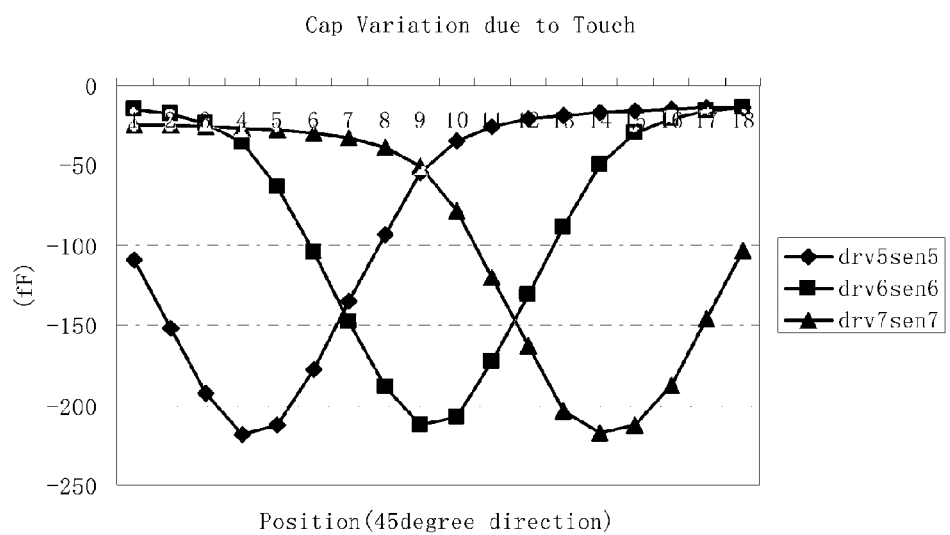
FIG. 12C is a graph illustrating capacitance variations due to a finger moving along sensing and driving lines of a capacitive sensing pattern in the simulation environment of FIG. 9.

FIG. 12C is a graph illustrating capacitance variations due to a finger moving in a 45° orientation along sensing and driving lines of a C-type pattern in the simulation environment of FIG. 9. As in FIGS. 12A and 12B, sensing sensitivity is superior to that of the A-type pattern but the capacitive variations are not symmetrical.

Figure 13A:
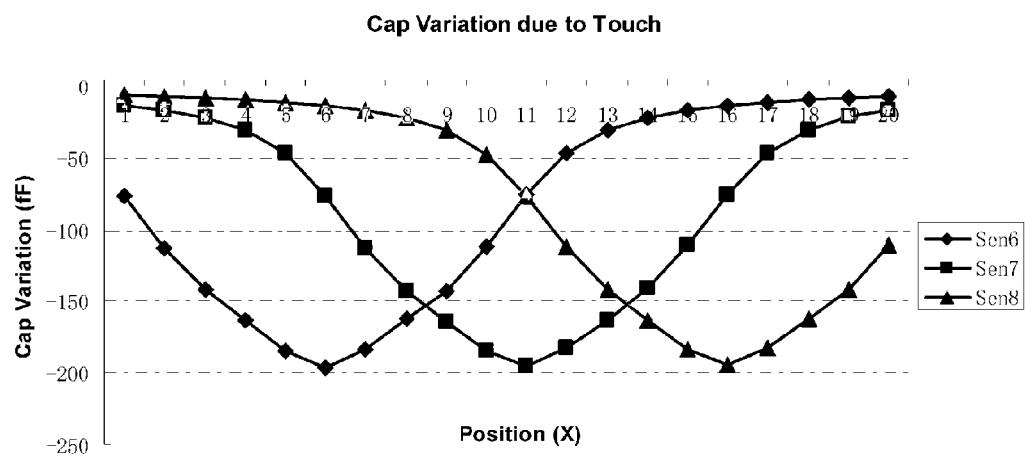
FIG. 13A is a graph illustrating capacitance variations due to a finger moving along sensing lines of a capacitive sensing pattern in the simulation environment of FIG. 9.

FIG. 13A is a graph illustrating capacitance variations due to a finger moving along sensing lines of a D-type pattern in the simulation environment of FIG. 9. In FIG. 13A, sensing sensitivity is superior to that of the A-type pattern and the capacitive variations are substantially symmetrical. Also, the capacitive variations form smooth parabolas, which can produce high sensing performance.

Figure 13B:
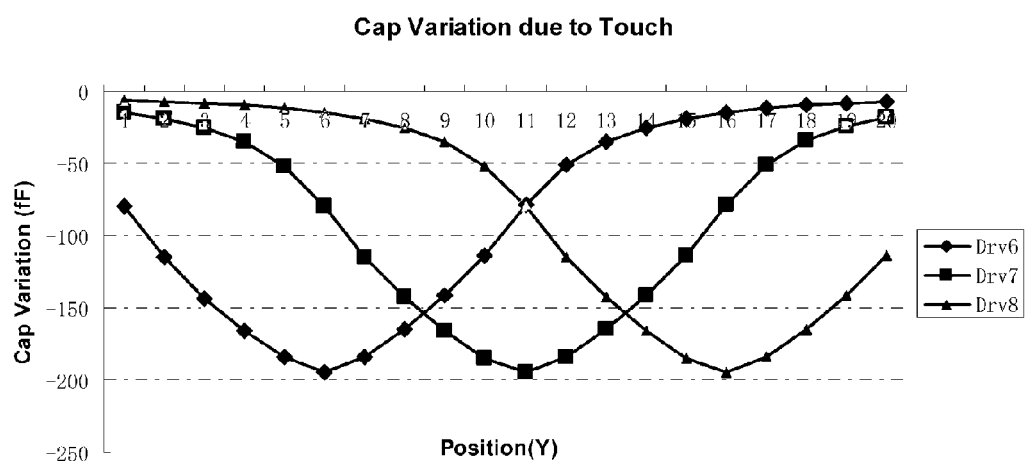
FIG. 13B is a graph illustrating capacitance variations due to a finger moving along driving lines of a capacitive sensing pattern in the simulation environment of FIG. 9.

FIG. 13B is a graph illustrating capacitance variations due to a finger moving along driving lines of a D-type pattern in the simulation environment of FIG. 9. As in FIG. 13A, sensing sensitivity is superior to that of the A-type pattern and the capacitive variations are substantially symmetrical. Also, the capacitive variations form smooth parabolas, which can produce high sensing performance.

Figure 13C:
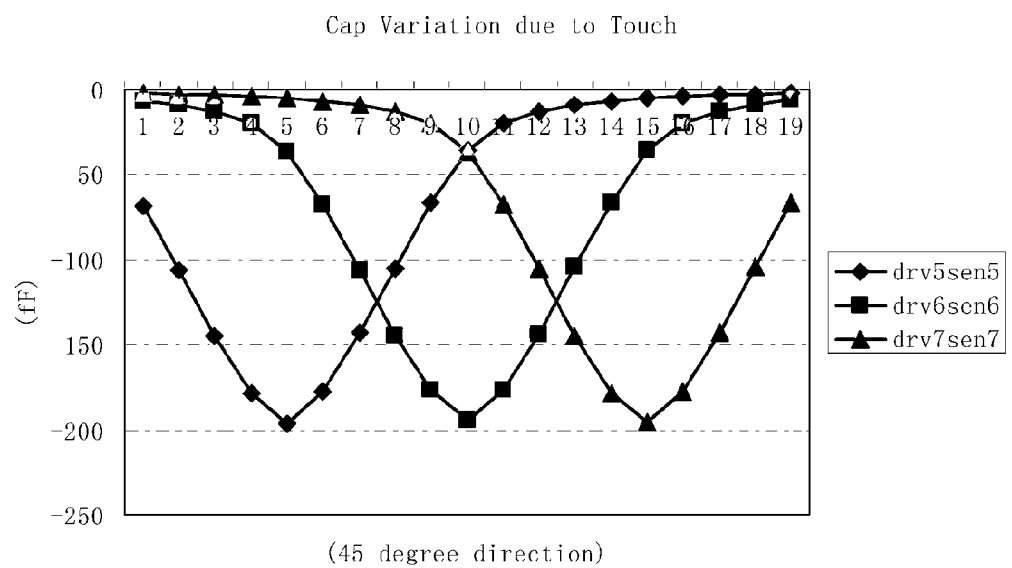
FIG. 13C is a graph illustrating capacitance variations due to a finger moving along sensing and driving lines of a capacitive sensing pattern in the simulation environment of FIG. 9.

FIG. 13C is a graph illustrating capacitance variations due to a finger moving in a 45° orientation along sensing and driving lines of a D-type pattern in the simulation environment of FIG. 9. As in FIGS. 13A and 13B, sensing sensitivity is superior to that of the A-type pattern and the capacitive variations are substantially symmetrical in a diagonal orientation. Also, the capacitive variations form smooth parabolas, which can produce high sensing performance. As indicated by FIGS. 13A through 13C, the D-type pattern can produce symmetrical capacitance variations along sensing lines, along driving lines, and in a 45° orientation.

Figure 14:
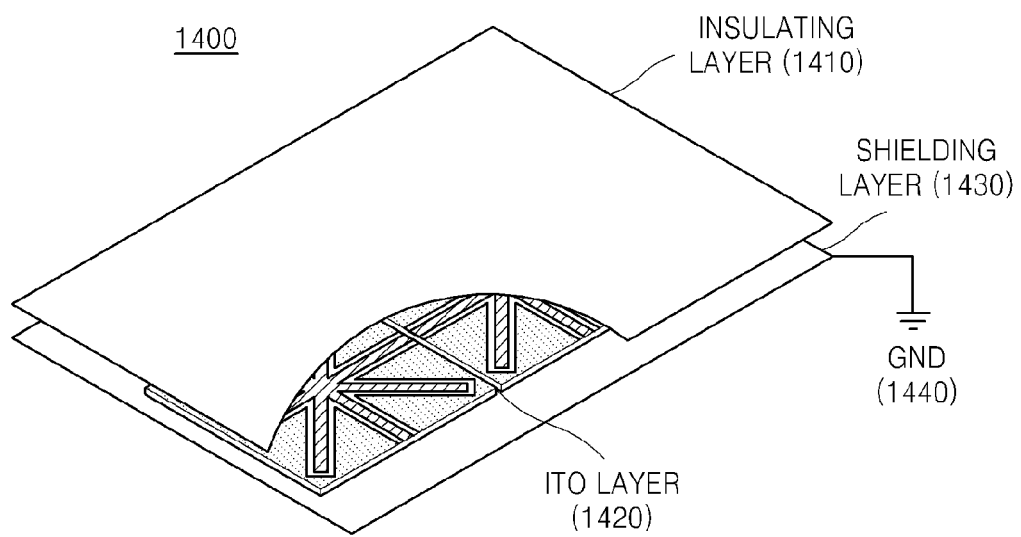
FIG. 14 is a partial perspective diagram of a capacitive sensing system using a capacitive sensing pattern according to an embodiment of the inventive concept.

FIG. 14 is a perspective view of a capacitive sensing system 1400 using a D-type pattern according to an embodiment of the inventive concept.

Referring to FIG. 14, capacitive sensing system 1400 comprises the D-type pattern as an ITO layer 1420, a shielding layer 1430 formed under ITO layer 1420, and an insulating layer 1410 formed on ITO layer 1420. In the example of FIG. 14, insulating layer 1410 forms a touch panel.

The touch panel is formed on top of capacitive sensing system 1400 to receive a touch. Because the capacitive touch panel is not required to bend, it can be formed of tempered glass to reduce scratches. Although the D-type pattern illustrated in FIG. 6D is used as ITO layer 1420 in FIG. 14, ITO layer 1420 can also use various modified patterns. For example, ITO layer 1420 can be formed with one of various capacitive sensing patterns illustrated in FIGS. 15 through 23. Shielding layer 1430 is connected to ground (GND) 1440.

FIGS. 15 through 23 are diagrams showing modified capacitive sensing patterns according to embodiments of the inventive concept.

Each of FIGS. 15 through 23 illustrates a grid unit, i.e., a pixel, of a capacitive sensing pattern. For explanation purposes, it will be assumed that regions shaded with solid lines represent sensing lines, and regions shaded with dots represent driving lines. However, in alternative embodiments, the regions shaded with solid lines can constitute driving lines, and the regions shaded with dotted lines can constitute sensing lines. In each of FIGS. 15 through 23, sense electrodes formed of a plurality of sensing lines and drive electrodes formed of a plurality of driving lines are formed in the same layer to increase a capacitance effect. Also, grid units, i.e., pixels, are electrically connected in a horizontal or vertical direction using flying conductors 690 illustrated in FIG. 6D.

Figure 15:
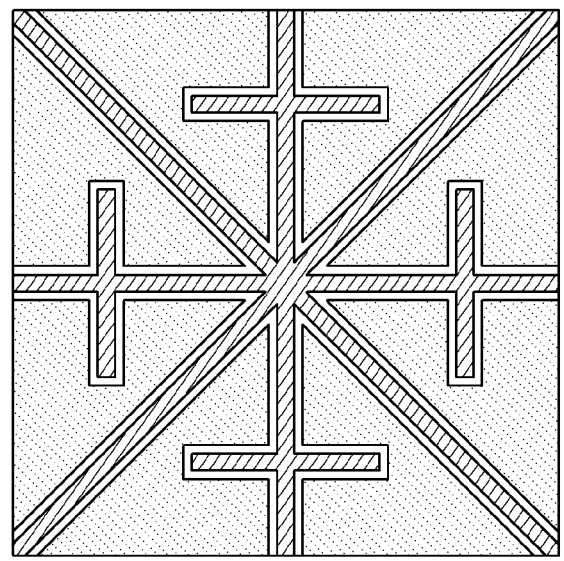
FIGS. 15 through 23 are diagrams illustrating capacitive sensing patterns according to various embodiments of the inventive concept.

A pixel illustrated in FIG. 15 is modified from a pixel of the D-type pattern illustrated in FIG. 6D (hereinafter referred to as a D-type pixel). The pixel of FIG. 15 is obtained by adding lines perpendicular to the arms of a + shape of a sensing line in the D-type pixel so as to form additional crosses. The pixel of FIG. 15 is substantially symmetrical in shape along sensing lines, along driving lines, and in a 45°-rotated orientation. A perimeter between sensing and driving lines may be increased in comparison to that in the D-type pixel and thus capacitance may increase.

Figure 16:
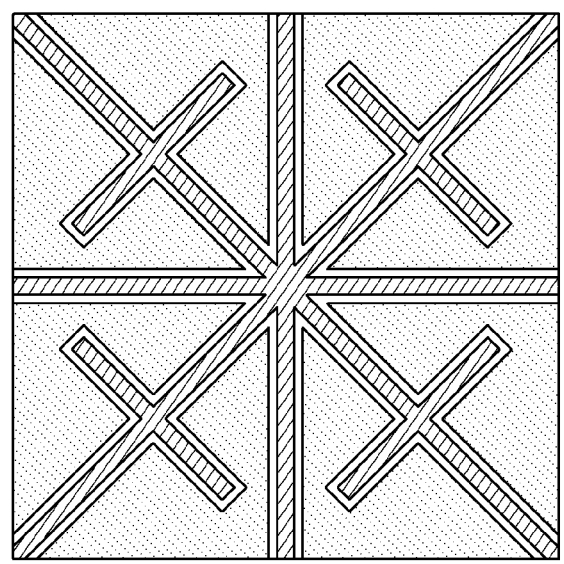

A pixel illustrated in FIG. 16 is obtained by adding lines perpendicular to arms of an x shape of a sensing line in the D-type pixel to form additional crosses. The pixel of FIG. 16 is substantially symmetrical in shape along sensing lines, along driving lines, and in a 45°-rotated orientation. A perimeter between sensing and driving lines is increased in comparison to that in the D-type pixel, and thus a capacitance is increased. In alternative embodiments, arms of crosses may be altered to be more asymmetrical according to user specifications. For instance, in FIG. 16, the shapes and lengths of the arms of crosses may vary.

Figure 17:
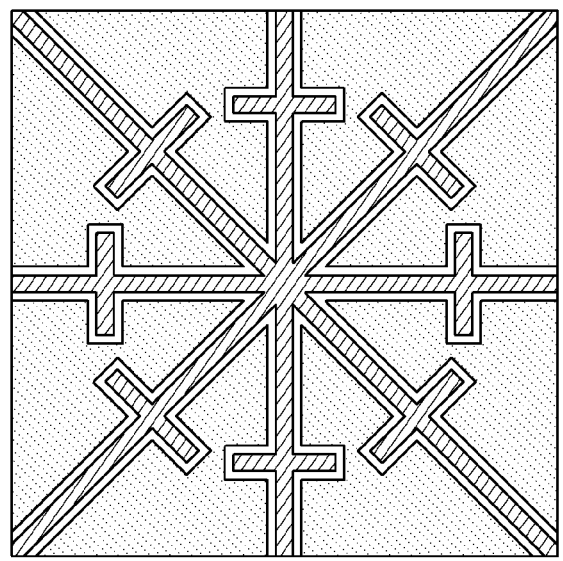

A pixel illustrated in FIG. 17 is obtained by adding lines perpendicular to all arms of a sensing line in the D-type pixel to form additional crosses. A perimeter between sensing and driving lines is increased in comparison to the D-type pixel and thus a capacitance is increased as well. Also, the pixel of FIG. 17 is relatively symmetrical in shape. However, the arms of the crosses can be adjusted to be asymmetrical according to user specifications.

Figure 18:
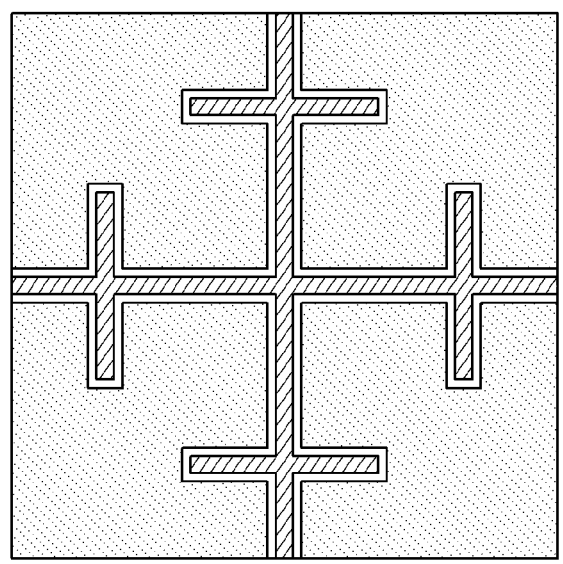

A pixel illustrated in FIG. 18 is obtained by removing an x shape from a sensing line in the pixel of FIG. 15. In the pixel of FIG. 18, the lengths of the arms of crosses can be varied. The perimeter between sensing and driving lines in FIG. 18 is almost the same as that in the D-type pixel, so its capacitance characteristics are similar to those of the D-type pixel. Also, the pixel of FIG. 18 is relatively symmetrical in shape. However, because it lacks the x shape of FIG. 15, it has lower capacitance compared with the pixel of FIG. 15.

Figure 19:
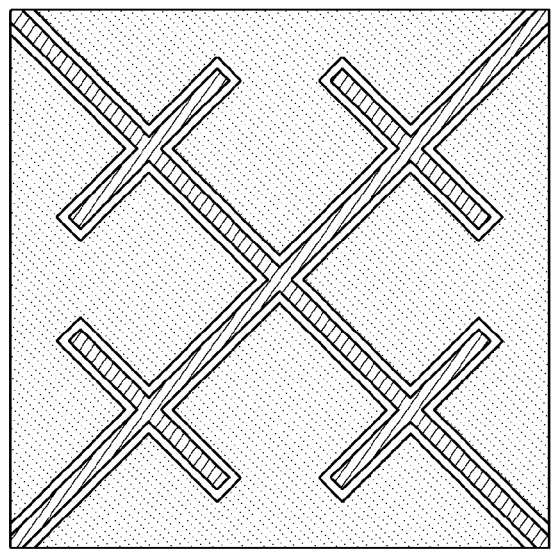

A pixel illustrated in FIG. 19 is obtained by removing a + shape from a sensing line in the pixel of FIG. 16. The pixel of FIG. 19 is relatively symmetrical in shape. However, the arms of the crosses can be varied to be asymmetrical according to user specifications.

Figure 20:
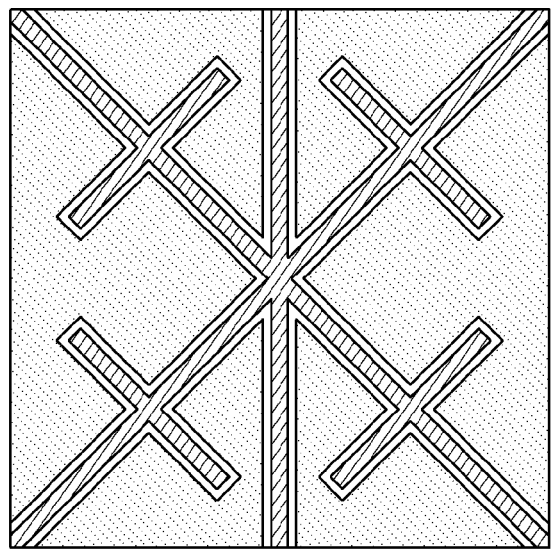

A pixel illustrated in FIG. 20 is obtained by removing a horizontal line from pixel of FIG. 16. The pixel of FIG. 20 is substantially symmetrical, but its capacitance is decreased compared to the pixel of FIG. 16.

Figure 21:
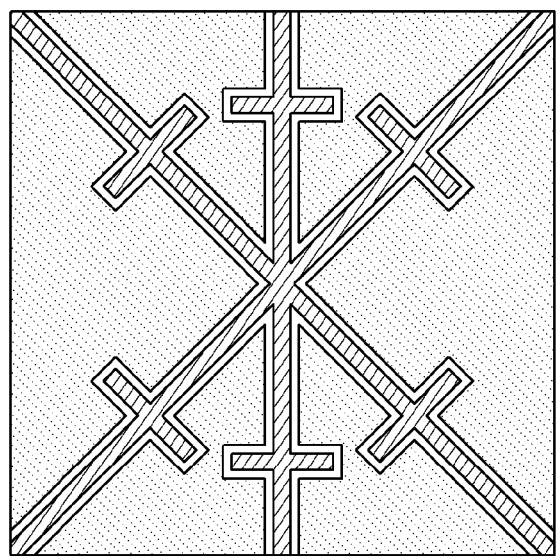

A pixel illustrated in FIG. 21 is obtained by removing a horizontal line and corresponding crosses from the pixel of FIG. 17. The pixel of FIG. 21 is substantially symmetrical, but it has decreased capacitance compared with the pixel of FIG. 17.

Figure 22:
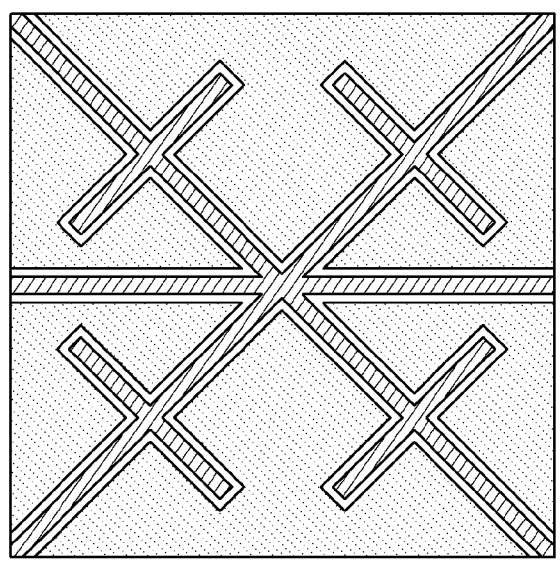

A pixel illustrated in FIG. 22 is obtained by removing a vertical line from the pixel of FIG. 16. The pixel of FIG. 22 is relatively symmetrical, but it has decreased capacitance compared with the pixel of FIG. 16.

Figure 23:
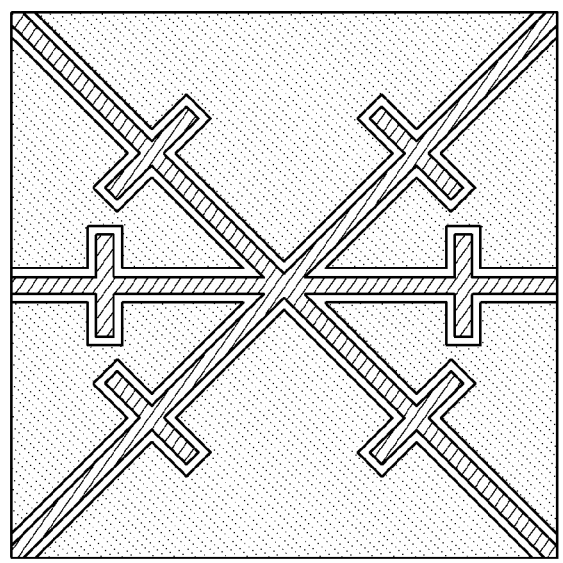

A pixel illustrated in FIG. 23 is obtained by removing a vertical line and corresponding crosses from the pixel of FIG. 17. The pixel of FIG. 23 is substantially symmetrical, but it has lower capacitance than the pixel of FIG. 17.

Figure 24:
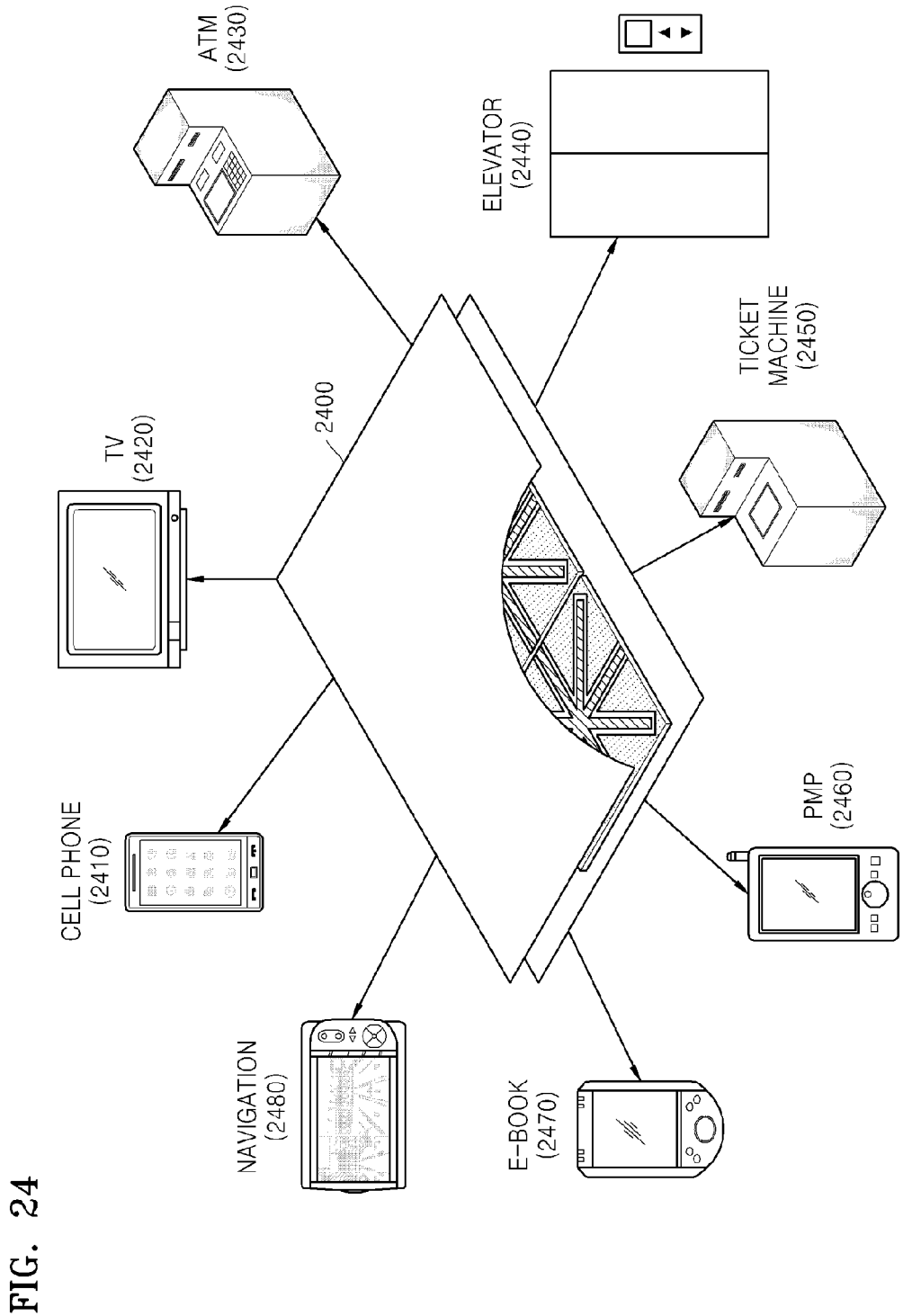
FIG. 24 is a diagram illustrating various products using capacitive sensing devices according to embodiments of the inventive concept.

FIG. 24 is a diagram showing various systems using a capacitive sensing device 2400 according to an embodiment of the inventive concept.

As indicated by FIG. 24, capacitive sensing device 2400 can be used in a wide variety of systems, such as a cell phone 2410, a television 2420, an automated teller machine 2430, an elevator 2440, a ticket machine 2450, a portable media player 2460, an e-book 2470, or a navigation system 2480. In these devices, capacitive sensing device 2400 can be used to replace traditional interfaces, buttons, and other input features.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A capacitive sensing device, comprising:
   first electrodes comprising rows and columns of first sensing elements; and
   second electrodes comprising rows and columns of second sensing elements,
   wherein each of the first sensing elements has the shape of an iron cross,
   wherein each of the second sensing elements has the shape of a double-cross in which a first cross has four arms radiating in straight lines, respectively from a central point of the second sensing element, a second cross has four arms radiating from in straight lines, respectively, from central point, whereby the first and second crosses overlap each other the central point, and the second cross is rotated about the central point with respect to the first cross,
   wherein the four arms of the first cross have the same length as measured from the central point, and the four arms of the second cross have the same length as measured from the central point, and
   wherein capacitances are formed between the first sensing elements and the second sensing elements.

2. The capacitive sensing device of claim 1, wherein the second cross is rotated by 45° with respect to the first cross.

3. The capacitive sensing device of claim 1, wherein the first electrodes are drive electrodes and the second electrodes are sense electrodes.

4. The capacitive sensing device of claim 1, further comprising flying conductors electrically connecting the first sensing elements to one another in each of the rows of the first sensing elements.

5. The capacitive sensing device of claim 1, wherein the first electrodes and the second electrodes together form one layer in the device so as to be coplanar.

6. The capacitive sensing device of claim 1, wherein the length of each of the arms of the first cross is different from the length of each of the arms of the second cross.

7. The capacitive sensing device of claim 1, wherein each of the second sensing elements has additional linear segments each of which is perpendicular to a respective one of the four arms of the first cross of the second sensing element, and
   wherein the first sensing elements are separated from the second sensing elements to form capacitors, are symmetrical in directions corresponding to the directions of the rows and columns of the first sensing elements, and occupy most of the space between adjacent ones of the second sensing elements.

8. The capacitive sensing device of claim 7, wherein each of the second sensing elements is symmetrical about an axis extending through the central point from which the arms thereof radiate.

9. The capacitive sensing device of claim 7, wherein the first electrodes and the second electrodes form one layer in the device so as to be coplanar.

10. The capacitive sensing device of claim 7, wherein each of the second sensing elements has additional linear segments each of which is perpendicular to a respective one of the four arms of the second cross of the second sensing element.

11. The capacitive sensing device of claim 10, wherein the each of the second sensing elements is symmetrical about an axis extending through the central point from which the arms thereof radiate.

12. The capacitive sensing device of claim 10, wherein the first electrodes and the second electrodes form one layer in the device so as to be coplanar.

13. A capacitive sensing system, comprising:
at least one touch panel;
rows and columns of first electrodes disposed under the touch panel, the first electrodes being electrically a connected to each other in each of the rows thereof;
rows and columns of second electrodes electrically connected to each other in each of the columns thereof,
wherein the first electrodes and the second electrodes form one layer in the system so as to be coplanar,
wherein each of the second electrodes has a double-cross shape in which a first cross has four arms radiating in straight lines, respectively, from a central point of the second electrode, a second cross has four arms radiating in straight lines, respectively, from the central point, whereby the first and second crosses overlap each other at the central point, and the second cross is rotated about the central point with respect to the first cross,
wherein the four arms of the first cross have the same length as measured from the central point, and the four arms of the second cross have the same length as measured from the central point, and
wherein, where a user touches the touch panel, a touch event is detected for at least one point where a row or column of the first electrodes crosses a row or column of the second electrodes; and
a shielding layer disposed under the layer of the first electrodes and second electrodes.

14. The capacitive sensing system of claim 13, wherein the first electrodes are drive electrodes and the second electrodes are sense electrodes.

15. The capacitive sensing system of claim 13, wherein the second cross is rotated by 45° with respect to the first cross.

16. The capacitive sensing system of claim 13, wherein the one layer is a layer of indium tin oxide (ITO).

\* \* \* \* \*